United States Patent [19]

Falk

[11] 4,295,336

[45] Oct. 20, 1981

[54] MASTER CYLINDER ASSEMBLY WITH DETACHABLE RESERVOIR

[75] Inventor: Edward J. Falk, St. Louis, Mo.

[73] Assignee: Wagner Electric Corporation, St. Louis, Mo.

[21] Appl. No.: 118,781

[22] Filed: Feb. 5, 1980

[51] Int. Cl.³ .............................................. B60T 11/20
[52] U.S. Cl. ........................................ 60/562; 60/589; 60/592; 248/674
[58] Field of Search ................. 60/585, 588, 589, 592, 60/562; 248/674, 219.4, 230, 231

[56] References Cited

U.S. PATENT DOCUMENTS

| | | | |
|---|---|---|---|
| 1,945,728 | 2/1934 | Brush | 60/585 |
| 1,985,588 | 12/1934 | Tatter | 60/589 |
| 3,545,206 | 12/1970 | Belart | 60/562 |
| 3,886,747 | 6/1975 | Harwick | 60/585 |
| 4,133,178 | 1/1979 | Brooks, Sr. | 60/578 |
| 4,175,392 | 11/1979 | Morimoto | 60/588 |
| 4,199,949 | 4/1980 | Cadeddu | 60/589 |
| 4,200,163 | 4/1980 | Bass | 60/592 |

FOREIGN PATENT DOCUMENTS

| | | | |
|---|---|---|---|
| 285070 | 12/1966 | Australia | 60/585 |
| 1246439 | 8/1967 | Fed. Rep. of Germany | 60/585 |

*Primary Examiner*—Abraham Hershkovitz
*Attorney, Agent, or Firm*—Eyre, Mann, Lucas & Just

[57] ABSTRACT

A master cylinder assembly includes a body in which fluid pressure is developed. A fluid reservoir is detachably attached to the sides of the body. Fluid communication between the fluid reservoir and the body is provided through one of the sides of the body.

2 Claims, 5 Drawing Figures

MASTER CYLINDER ASSEMBLY WITH DETACHABLE RESERVOIR

BACKGROUND AND SUMMARY OF THE INVENTION

This invention relates to master cylinder assemblies of the type wherein the fluid reservoir is readily detachable from the body such as disclosed in U.S. Pat. Nos. 3,886,747 and 4,133,178.

The master cylinder assembly of the present invention includes a body having a bore therein and having first and second sides, a fluid reservoir, and first and second means detachably attaching the fluid reservoir to the first and second sides, respectively, of the body. The first means includes a boss preferably on the fluid reservoir engaged in a hole preferably in the first side of the body, and the second means includes a threaded member connected to the second side of the body. Also, a fluid intake port is in the first side of the body intersecting the bore and the hole, and a fluid passage is extended through the boss communicating with the fluid intake port.

DESCRIPTION OF THE DRAWINGS

FIG. 3 is a sectional view of the master cylinder assembly of FIG. 1 taken along lines 3—3 thereof;

FIG. 4 is an enlarged view of a portion of the master cylinder assembly as shown in FIG. 3; and FIG. 5 is an enlarged view of another embodiment of the portion of the master cylinder assembly shown in FIG. 4.

DESCRIPTION OF THE PREFERRED EMBODIMENT

Figure 1:
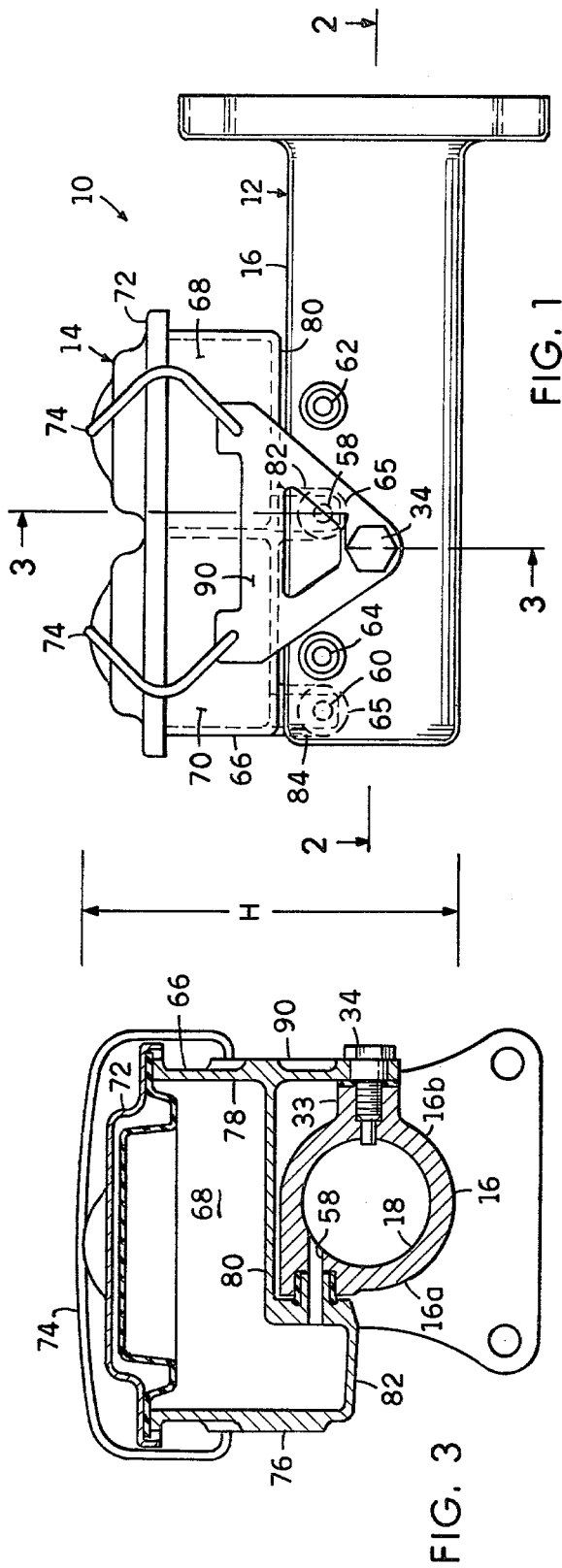
FIG. 1 is a side view of a master cylinder assembly embodying the present invention.

In FIG. 1, the preferred embodiment of the master cylinder assembly of the present invention is generally designated 10 and includes a body 12 and a fluid reservoir 14. Preferably, the body 12 is formed of metal and the fluid reservoir 14 is formed of metal or plastic.

Figure 2:
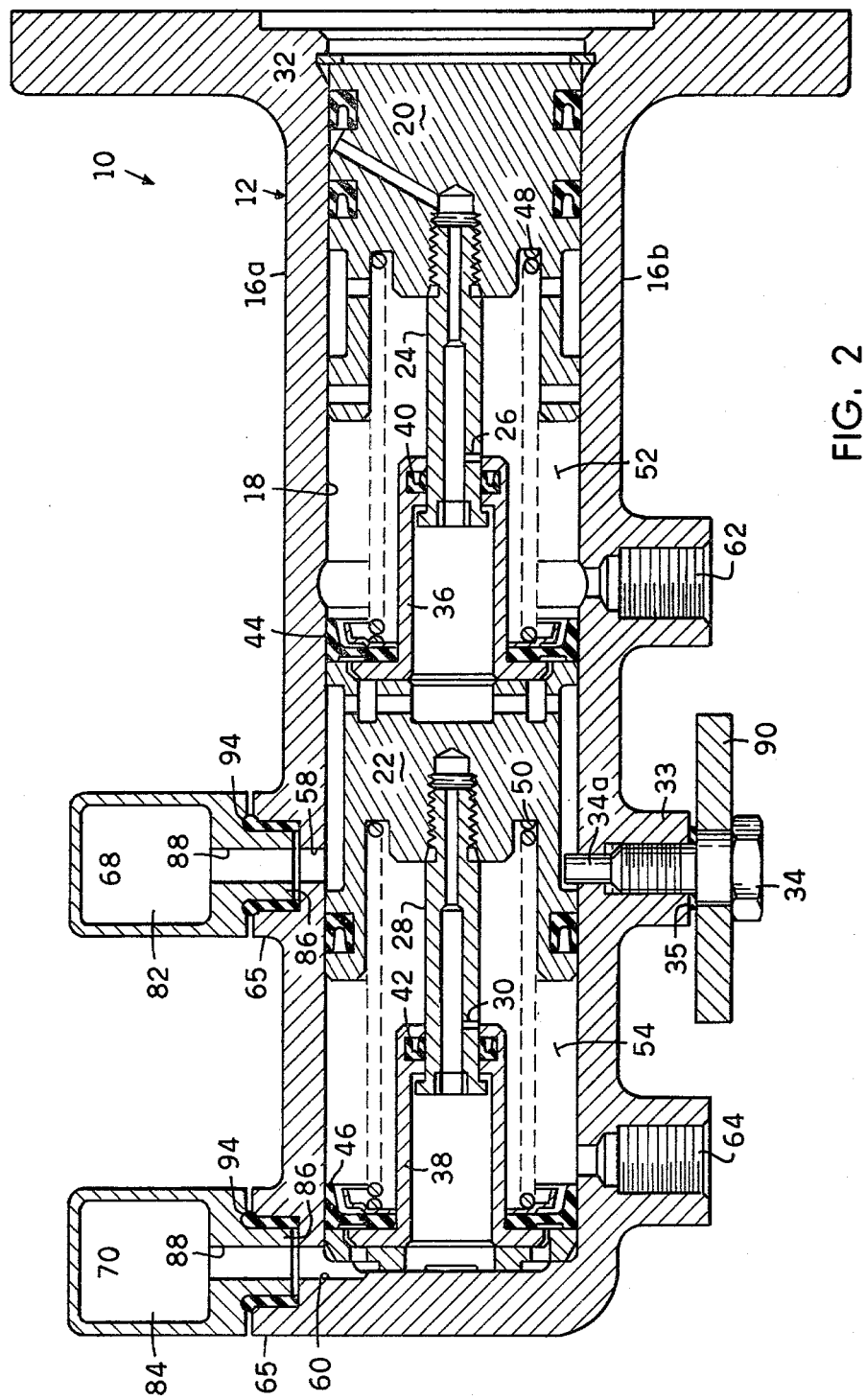
FIG. 2 is a sectional view of the master cylinder assembly of FIG. 1 taken along lines 2—2 thereof.

Referring now to FIGS. 2 and 3, the body 12 in the preferred embodiment includes a housing 16 of cylindrical shape which has first and second sides 16a and 16b, respectively, located on opposite sides of the vertical plane Y. The housing 16 also has an axial bore 18. A primary piston 20 and a secondary piston 22 are movably positioned in the bore 18. A stem 24 having a porthole 26 therein is attached to the primary piston 20, and a stem 28 having a porthole 30 therein is attached to the secondary piston 22. A snap ring 32 which is disposed in a groove adjacent the open end of the bore 18 limits the rightward movement of the primary piston 20. A threaded member such as a bolt 34 is threaded into a boss 33 formed on the second side 16b of the housing 16 and has its end 34a extending into the bore 18 to prevent extreme rightward movement of the secondary piston 22. A gasket seal 35 is disposed between the boss 33 and the bolt 34 to prevent fluid leakage.

Guide members 36 and 38 are provided for telescopically receiving the stems 24 and 28, respectively. The guide member 36 carries a sealing member 40 in sliding and sealing engagement with the outer peripheral surface of the stem 24, and the guide member 38 carries a sealing member 42 in sliding and sealing engagement with the outer peripheral surface of the stem 28. Sealing cups 44 and 46 which have outer annular lips in sliding and sealing engagement with the annular wall of the bore 18 are disposed adjacent the guide members 36 and 38, respectively. The guide member 36 is sealingly received in a central hole in the sealing cup 44, and the guide member 38 is sealingly received in a central hole in the sealing cup 46. Return spring 48 is provided to normally urge the primary piston 20 into engagement with the snap ring 32, and return spring 50 is provided to normally urge the secondary piston 22 into engagement with the guide member 36.

A primary fluid chamber 52 and a secondary fluid chamber 54 are formed in the bore 18, and the portholes 26 and 30 communicate with the fluid chambers 52 and 54, respectively, when the primary and secondary pistons 20 and 22 are in their fully released positions shown in FIG. 2. Intake ports 58, 60 (shown in phantom in FIG. 1) are provided in the first side 16a of the housing 16 intersecting the bore 18 and outlet ports 62, 64 (also shown in FIG. 1) are provided in the second side 16b of the housing 16 intersecting the bore 18. A pair of annular bosses 65 (one of which is shown in FIG. 3) extend outwardly from the first side 16a of the housing 16 concentric with the intake ports 58, 60.

During actuation of the master cylinder assembly 10, the pistons 20, 22 are moved leftward in FIG. 2 thereby moving the portholes 26, 30 past the sealing members 40, 42 thus closing communication between the fluid chambers 52, 54 and the portholes 26, 30. The leftward movement of the pistons 20, 22 then establishes fluid pressure in the fluid chambers 52, 54 which is delivered through the outlet ports 62, 64 to separate branches of a dual brake system (not shown). When the pistons 20, 22 return to their fully released positions of FIG. 2, communication will be re-established between the fluid chambers 52, 54 and the portholes 26, 30.

The particular type of body 12 is also disclosed in U.S. Patent application Ser. No. 050,196 filed on June 20, 1979 and assigned to the same assignee as this application.

Referring now to FIGS. 1 and 3, the fluid reservoir 14 in the preferred embodiment includes a housing 66 having two separate fluid compartments 68 and 70. A removable cover 72 is secured on the top of the housing 66 by bail wires 74. As best shown in FIG. 3, the housing 66 includes flat side wall portions 76, 78 and a flat bottom wall portion 80. The housing 66 also includes depending portions 82 and 84. An annular boss 86 (one of which is shown in FIG. 4) extends outwardly from each of the depending portions 82, 84, and a fluid passage 88 extends through each boss 86. A triangular bracket 90 is attached to the side wall portion 78 and extends downwardly therefrom.

The fluid reservoir 14 is mounted on the body 12 by first inserting the pair of bosses 86 in a pair of holes 92 (one of which is shown in FIG. 4) formed in the body housing bosses 65 concentric with the intake ports 58, 60. A bushing seal 94 is disposed between each boss 86 and its associated hole 92 to prevent fluid leakage. Alternatively as shown in FIG. 5, an O-ring seal 96 may be used, and each boss 86a and its associated hole 92a would have annular shoulders 98 and 100, respectively, for holding the O-ring seal 96 in position. Subsequent to inserting the bosses 86 in the holes 92, the bolt 34 is inserted through a hole in the lower end of the bracket 90 and is threaded into the body housing boss 33 as shown in FIGS. 2 and 3. The fluid reservoir 14 is then secured to the body 12 but is readily detachable therefrom.

An important advantage of the master cylinder assembly 10 of the present invention is its low profile, designated H in FIG. 1, which is accomplished primarily by attaching the fluid reservoir 14 to the first and second sides 16a, 16b of the body housing 16 as shown in FIG. 3 rather than to the top thereof such as in the master cylinder assemblies disclosed in U.S. Pat. Nos. 3,886,747 and 4,133,178. The master cylinder assembly 10 of the present invention has another advantage in that the secondary piston stop bolt 34 is also used as a means for attaching the fluid reservoir 14 to the body 12.

It is intended that the following claims cover all modifications and variations of the preferred embodiment of the invention, herein chosen for the purpose of illustration, without departing from the spirit and scope of the invention.

What is claimed is:

1. A master cylinder assembly comprising:
   (a) a body having a bore therein and having first and second sides;
   (b) primary and secondary pistons movably disposed in said bore defining primary and secondary fluid chambers, respectively, in said bore;
   (c) a fluid reservoir having depending reservoir portions on one side and a depending bracket on the other side;
   (d) first and second means detachably attaching said fluid reservoir to the first and second sides, respectively, of said body so that said depending reservoir portions and said depending bracket straddle said body;
   (e) said first means comprising bosses on said depending reservoir portions, holes in said body first side, said bosses engaged in said holes; and
   (f) said second means comprising a threaded member connecting said fluid reservoir depending bracket to said body second side, said threaded member extending into said bore and acting as a stop for rearward movement of said secondary piston.

2. The master cylinder assembly defined in claim 1, further comprising:
   (a) a stem attached to said primary piston, said stem having port means therein communicating with said primary fluid chamber; and
   (b) another stem attached to said secondary piston, said another stem having port means therein communicating with said secondary fluid chamber.

* * * * *